(No Model.)
C. T. BUSH.
HOP TRAINING DEVICE.
No. 294,723. Patented Mar. 4, 1884.
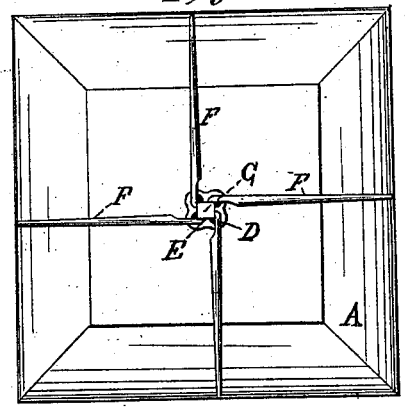
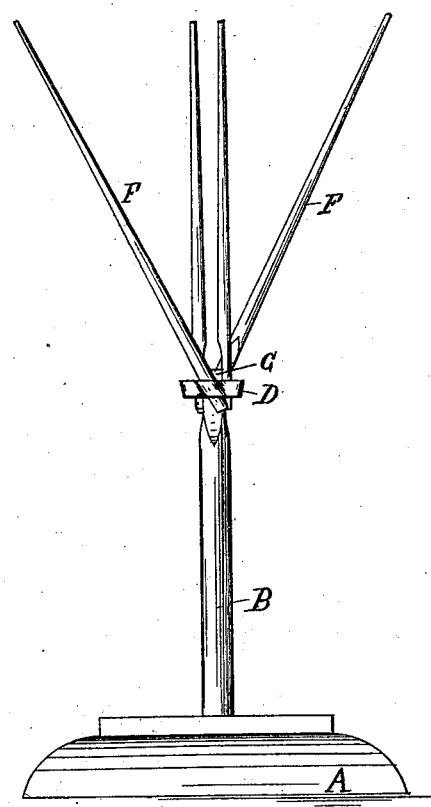
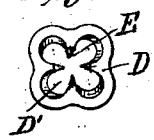
Witnesses.
Sam'l R. Turner
Julius Solger
Inventor.
Clark T. Bush
Howard A. Thow.
Att'y

United States Patent Office.

CLARK T. BUSH, OF MARYLAND, NEW YORK.

HOP-TRAINING DEVICE.

SPECIFICATION forming part of Letters Patent No. 294,723, dated March 4, 1884.

Application filed September 6, 1883. (No model.)

*To all whom it may concern:*

Be it known that I, CLARK T. BUSH, of Maryland, county of Otsego, and State of New York, have invented a new and useful Improvement in Hop-Training Devices; and I do hereby declare that the following is a full, clear, and exact description of the invention, which will enable others skilled in the art to which it appertains to make and use it, reference being had to the accompanying drawings, forming a part thereof.

My invention consists in having one short pole at each hill of the hops, set into the ground, and having a cap on top of said pole containing four or more sockets for the purpose of holding four or more other smaller poles or branches, in such a manner that the top of said smaller poles may unite at their tops or near their tops with twine or wire, thus forming a hedge or arch for the vines to run over. If the hills are five or six feet apart, and the poles, say, about five feet above ground, and the smaller poles or branches about ten (10) or twelve (12) feet, they would give about fifteen or seventeen feet for the vines to run on.

The above is an improvement on my former Patent No. 71,128, granted November 19, 1867.

I attain the above by the mechanism illustrated in the accompanying drawings, in which—

Figure 1 represents a top or plan view of my improvement; Fig. 2, a vertical view of the same, and Fig. 3 a view of my improved socket.

Similar letters of reference refer to similar parts throughout the several views.

The letter B represents the standard or ground-post, having its upper end cut away to form a square, C, adapted to receive a cap, D, formed as shown in Fig. 3, and provided with the sockets D', having the sharpened points E, for the purpose of holding the cap in a firm and rigid position when driven down on the square of the pole B.

F F are the smaller or additional poles or branches, which may be fastened at their upper ends with twine or wire, and which have their ends beveled off on one side for the purpose of being firmly secured when driven into the sockets D'. The cap and sockets are so formed as to give four different directions to the smaller poles or branches which are placed in them. The form of the cap is more fully shown in Fig. 3, and by means of this cap each hill may be connected with four other hills next to it. By this arrangement the upper portions of the vines are separated, so as to allow the air to circulate and the sun to penetrate, thereby avoiding mildew and vermin, which destroy the hops. It also forms facilities for gathering the crop without removing the lower poles, the vines being cut near the cap and the branches removed for picking.

The cap D might be formed with one or more sockets, so constructed to allow of the additional poles to be set in any direction which it might be thought desirable.

I do not desire to claim, broadly, the pole B and the smaller poles or branches F, for such, I am aware, have been used prior to my invention; but What I do claim, and desire to secure by Letters Patent, is—

In combination with the standard or ground-post and the upper or smaller sticks, the cap or ring D, formed with a central quarterfoil opening, the space between the points adapted to receive the ground-stick, and the segments thereof adapted to receive the upper or smaller sticks and admit of their free ends being spread apart, substantially as and for the purposes set forth.

In testimony that I claim the foregoing I append my signature.

CLARK T. BUSH.

Witnesses:
J. B. ROBINSON,
A. J. PARSONS.